United States Patent [19]
Imeokparia et al.

[11] Patent Number: 5,824,710
[45] Date of Patent: Oct. 20, 1998

[54] EXTRUDED, OPEN-CELL FOAM AND PROCESS FOR MAKING

[75] Inventors: Daniel D. Imeokparia, Pickerington; Creston D. Shmidt, Nashport; Kyung W. Suh, Granville, all of Ohio

[73] Assignee: The Dow Chemical Company, Midland, Mich.

[21] Appl. No.: 722,270

[22] PCT Filed: Jan. 11, 1995

[86] PCT No.: PCT/US95/00417

§ 371 Date: Oct. 9, 1996

§ 102(e) Date: Oct. 9, 1996

[87] PCT Pub. No.: WO96/00258

PCT Pub. Date: Jan. 4, 1996

[51] Int. Cl.$^6$ ............................................. C08J 9/08
[52] U.S. Cl. ................. 521/79; 264/50; 264/53; 521/81; 521/139; 521/146
[58] Field of Search ................ 521/79, 139, 81, 521/146; 264/50, 53

[56] References Cited

U.S. PATENT DOCUMENTS

| | | | |
|---|---|---|---|
| 5,434,195 | 7/1995 | Imeokparia et al. | 521/79 |
| 5,618,853 | 4/1997 | Vonken et al. | 521/79 |

*Primary Examiner*—Morton Foelak
*Attorney, Agent, or Firm*—J. Robert Dean, Jr.

[57] ABSTRACT

Disclosed is an extruded, open-cell alkenyl aromatic polymer foam useful in insulating applications. The foam has an open cell content of 30 percent or more. The foam further has in minor dimension and cross section of greater than 6.5 millimeters. The foams has a high heat distortion temperature, and is particularly useful in roofing applications. Further disclosed is a process for making the open-cell foam.

12 Claims, No Drawings

EXTRUDED, OPEN-CELL FOAM AND PROCESS FOR MAKING

This invention relates to an extruded, open-cell alkenyl aromatic polymer foam and a process for making.

Alkenyl aromatic polymer foams have been employed extensively in a variety of insulating applications. The most common types employed are closed-cell extruded foams and expanded bead foams. Extruded foams are made by forming a gel of a polymer melt and a blowing agent under heat and pressure, and extruding the gel through a die into a region of lower pressure. The lower pressure causes the gel to expand, cool, and solidify to form the foam. Bead foams are made by charging a mold with solid, expandable polymer beads containing an imbibed blowing agent or pre-expanded beads, and exposing the beads to heated air or steam to effect their expansion, coalescence, and adherence to form a unitary foam mass or article.

Heat distortion temperature of an alkenyl aromatic foam is very important when the foam is being used in a relatively high temperature application close to the service temperature limit (about 165° F. for a conventional closed-cell polystyrene foam) of the foam. If the heat distortion temperature of a foam is too low, it may be subject to disfigurement and/or rupture.

Extruded, closed-cell foams are more vapor-resistant, more water-resistant, and mechanically stronger than expanded bead foams. Extruded, closed-cell foams have these advantages because they are made in a solid, cellular form. Expanded bead foams, in contrast, are formed in a coalesced mass of discrete, expanded foam beads.

Expanded bead foams typically better maintain their shape in a high temperature environment than extruded, closed-cell foams because they typically have better bowing characteristics. Their bowing characteristics are better because the coalesced expanded beads allow for greater mechanical relaxation compared to the solid, cellular form of extruded, closed-cell foams.

A common high temperature application for alkenyl aromatic foams is in roofing. In roofing, the foam is typically employed below a roofing membrane, which is dark and rubber-like, and may reach service temperature limits when underneath a membrane exposed to direct sunlight in the summer months. If the foam becomes distorted, the membrane and the foam may separate to form void pockets, which leaves the membrane with less mechanical support on its undersurface. The lack of undersurface support renders the membrane more subject to rupture, which results in water leaking in the roof.

It would be desirable to have an alkenyl aromatic foam which had a vapor resistance, water resistance, and mechanical strength similar to that of extruded, closed-cell foams and bowing characteristics similar to that of expanded bead foams.

According to the present invention, there is an extruded, open-cell alkenyl aromatic polymer foam. The foam comprises an alkenyl aromatic polymer material having greater than 50 percent by weight alkenyl aromatic monomeric units. The foam has an open cell content of 30 percent or more, and preferably 30 to 80 percent according to ASTM D2856-87. The foam has a minor dimension in cross-section (thickness) of greater than 0.25 inches (6.4 millimeters (mm)). The foam preferably has a density of 1.5 pounds per cubic foot (pcf) to 6.0 pcf (24 to 96 kilograms per cubic meter ($kg/m^3$)) according to ASTM D1622-88. The foam preferably has an average cell size of from 0.08 millimeters (mm) to 1.2 mm according to ASTM D3576-77. The foam preferably has a heat distortion temperature of from 175° F. to 210° F. according to ASTM D-2126-87. The foam is useful in a variety of insulating, cushioning, and protective applications. Since the foam has a relatively high heat distortion temperature, it is particularly useful in high-temperature insulating applications such as in roofing.

According to the present invention, there is a process for making an extruded, open-cell alkenyl aromatic polymer foam having a minor dimension and cross-section of greater than 0.25 inches (6.4 millimeters). The process comprises: a) heating an alkenyl aromatic polymer material comprising more than 50 percent by weight alkenyl aromatic monomeric units to form a melt polymer material; b) incorporating into the melt polymer material an amount of a nucleating agent sufficient to result in a foam having 30 percent or more open cell content; c) incorporating into the melt polymer material at an elevated pressure a blowing agent to form a foamable gel; d) cooling the foamable gel to a suitable foaming temperature; and e) extruding the foamable gel through a die into a region of lower pressure to form the foam. The foaming temperature ranges from 118° C. to 145° C. wherein the foaming temperature is from 3° C. to 15° C. higher than the highest foaming temperature for a corresponding closed-cell foam. Preferred foaming temperature is 33° C. or more higher than the glass transition temperature (according to ASTM D-3418) of the alkenyl aromatic polymer material.

Extruded alkenyl aromatic foams of relatively high open-cell content (30 to 80 percent), relatively high cross-section thickness (greater than 0.25 inches (6.4 mm)), and relatively low density (1.5 pcf to 6.0 pcf ($24\ kg/m^3$ to $96\ kg/m^3$)) have previously been difficult to prepare. Problems encountered included small cross-section, small cell size, low compressive strength, and higher density.

Preparing the above foams is difficult because the need for a small average cell size is incongruous with the need for desirable levels of density, cross-section thickness, and compressive strength. In making an open-cell foam, cell walls must be sufficiently thin upon expansion of the foam such that a certain proportion of them rupture so that the desired open-cell content is attained. Making sufficiently thin cell walls requires that the average cell size be relatively small, since cell wall thickness is proportional to cell size. Making a foam with a sufficiently small average cell size typically requires that relatively large amounts of a nucleating agent be employed. The large degree of nucleation to achieve small average cell size results in foam expansion which is too rapid. The rapid expansion causes premature cooling of the expanded foam, which results in small cross-section and high density.

In the prior art, open-cell polystyrene foam sheet of up to 0.25 inches (6.4 millimeters) have been prepared. Such foams range from 10 percent to 40 percent open cell, and range in density from 3 pcf to 6 pcf ($48\ kg/m^3$ to $96\ kg/m^3$). Such foams are typically produced with an annular die, and are slit to shape. Such foams are typically employed in packaging applications, and are too thin for roofing applications.

In the present process, a relatively high foaming temperature is employed along with a nucleating agent to make the desired open-cell foams. The relatively high foaming temperature enables the open-cell foam to be made with a lower degree of nucleation than with a lower foaming temperature. The relatively higher foaming temperature results in the polymer material in the cell wall being less viscous than at a lower foaming temperature. A less viscous cell wall is more likely to rupture upon expansion of the foam, and, thus, is more likely to form a foam with higher open-cell content. The less viscous the cell wall during foam expansion, the thicker the cell wall, and, thus, the larger the cell size that may be employed in the open-cell foam.

In the present process, the foaming temperature, which is relatively higher than that for making closed-cell foams (less than 10 percent open-cell according to ASTM D2856-87), may vary from 118° C. to 145° C. Foaming temperature will vary according to nucleating agent composition and concentration, blowing agent composition and concentration, polymer material characteristics, and extrusion die design. The foaming temperature for the present open-cell foam varies from 3° C. to 15° C. and preferably 10° C. to 15° C. higher than the highest foaming temperature for a corresponding closed-cell foam (less than 10 percent open-cell according to ASTM D2856-87) of substantially equivalent density and cell size made with a substantially equivalent composition (including polymer material, nucleating agent, additives, and blowing agent) in a substantially equivalent process. A preferred foaming temperature is 33° C. or more greater than the glass transition temperature (according to ASTM D-3418) of the alkenyl aromatic polymer material. A most preferred foaming temperature is from 135° C. to 140° C.

The amount of nucleating agent employed to prepare the present open-cell foam will vary according to desired cell size, foaming temperature, and composition of the nucleating agent. Open-cell content increases with increasing nucleating agent content. Useful nucleating agents include calcium carbonate, calcium stearate, talc, clay, titanium dioxide, silica, barium stearate, diatomaceous earth, mixtures of citric acid and sodium bicarbonate, and the like. Preferred nucleating agents are talc and calcium stearate. The amount of nucleating agent employed may range from 0.01 to 5 parts by weight per hundred parts by weight of a polymer resin. The preferred range is from 0.4 to 3.0 parts by weight.

The present foam has a density of 1.5 pcf to 6.0 pcf (24 kg/m$^3$ to 96 kg/m$^3$) and preferably a density of 2.0 pcf to 3.5 pcf (32 kg/m$^3$ to 48 kg/m$^3$) according to ASTM D-1622-88.

The present foam has an average cell size of from 0.08 millimeters (mm) to 1.2 mm and preferably from 0.10 mm to 0.9 mm according to ASTM D3576-77.

In the present invention, the foam is particularly suited to be formed into a plank, desirably one having a minor dimension in cross-section (thickness) of greater than 0.25 inches (6.4 millimeters) and preferably 0.375 inches (9.5 millimeters) or more. Further, preferably, the foam has a cross-sectional area of 30 square centimeters (cm) or more.

The present foam has an open cell content of 30 percent or more, preferably 30 to 80 percent, and most preferably 40 to 60 percent according to ASTM D2856-87.

The present foam is generally prepared by heating an alkenyl aromatic polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer, or blender. The blowing agent is mixed with the melt polymer material at an elevated pressure sufficient to prevent substantial expansion of the melt polymer material and to generally disperse the blowing agent homogeneously therein. A nucleating agent is blended in the polymer melt or dry blended with the polymer material prior to plasticizing or melting. The foamable gel is typically cooled to a lower temperature to optimize or attain desired physical characteristics of the foam. The gel may be cooled in the extruder or other mixing device or in separate coolers. The gel is then extruded or conveyed through a die of desired shape to a zone of reduced or lower pressure to form the foam. A preferred die design is a rectangular or slit die, which are advantageous for making plank products. The zone of lower pressure is at a pressure lower than that in which the foamable gel is maintained prior to extrusion through the die. The lower pressure may be superatmospheric or subatmospheric (evacuated or vacuum), but is preferably at an atmospheric level.

Blowing agents useful in making the present foam include inorganic agents, organic blowing agents and chemical blowing agents. Suitable inorganic blowing agents include carbon dioxide, nitrogen, argon, water, air, nitrogen, and helium. Organic blowing agents include aliphatic hydrocarbons having 1–9 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, and neopentane. Aliphatic alcohols include, methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, and perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124), and the like. Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, and N,N'-dimethyl-N,N'-dinitrosoterephthalamide and trihydrazino triazine.

The amount of blowing agent incorporated into the polymer melt material to make a foam-forming gel is from 0.2 to 5.0 gram-moles per kilogram of polymer, preferably from 0.5 to 3.0 gram-moles per kilogram of polymer, and most preferably from 0.7 to 2.0 gram-moles per kilogram of polymer. A preferred blowing agent is a mixture of carbon dioxide and ethyl chloride.

The present foam comprises an alkenyl aromatic polymer material. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 and preferably greater than 70 weight percent alkenyl aromatic monomeric units. Most preferably, the alkenyl aromatic polymer material is comprised entirely of alkenyl aromatic monomeric units.

Suitable alkenyl aromatic polymers include those derived from alkenyl aromatic compounds such as styrene, alphamethylstyrene, ethylstyrene, vinyl benzene, vinyl toluene, chlorostyrene, and bromostyrene. A preferred alkenyl aromatic polymer is polystyrene. Minor amounts of monoethylenically unsaturated compounds such as $C_{2-6}$ alkyl acids and esters, ionomeric derivatives, and $C_{4-6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate. The foams are preferably substantially free of rubbery or rubber-like substances such as those with $C_{4-6}$ diene monomeric content, including 1,3-butadiene monomeric content. The foams are further preferably substantially free of thermoset polymers such as polyurethanes. Preferred foams comprise substantially (that is, greater than 90 percent) and most preferably entirely of polystyrene.

The present foam optionally further comprises carbon black to enhance insulating capability. The carbon black may comprise between 1.0 and 25 weight percent and preferably between 4.0 and 10.0 weight percent based upon the weight of the alkenyl aromatic polymer material in the foam. The carbon black may be of any type known in the art such as furnace black, thermal black, acetylene black, and channel black. A preferred carbon black is thermal black. A preferred thermal black has an average particle size of 150 nanometers or more.

Small amounts of an ethylene polymer such as linear low density polyethylene or high density polyethylene may be incorporated into the foamable gel to enhance open-cell content upon extrusion and foaming.

The present foam preferably has a heat distortion temperature of from 175° F. to 210° F. and more preferably from 190° F. to 205° F. according to ASTM D-2126-87. The present foam has excellent heat distortion characteristics due to its open-cell content.

The present foam is substantially non-crosslinked. Substantially non-crosslinked means the foam is substantially free of crosslinking, but is inclusive of the slight degree of crosslinking which may occur naturally without the use of crosslinking agents or radiation. A substantially non-crosslinked foam has less than 5 percent gel per ASTM D-2765-84, method A.

Various additives may be incorporated in the present foam such as inorganic fillers, pigments, antioxidants, acid scavengers, ultraviolet absorbers, flame retardants, processing aids, and extrusion aids.

The following are examples of the present invention, and are not to be construed as limiting. Unless otherwise indicated, all percentages, parts, or proportions are by weight.

Open-cell foams were prepared according to the present invention.

The apparatus for making the foam comprised an extruder, a mixer, a cooler, and a die in series. Two different extrusion systems were used. The foams represented in Table 1 were made with a 1½ inch (3.8 centimeter) extruder. The foams represented in Table 2 were made with a 2½ inch (6.4 centimeter) extruder.

A polystyrene resin and additives were dry-blended, and fed to the extruder to form a polymer melt. A blowing agent was added to the polymer melt in the mixer to form a foamable gel. The temperature of the foamable gel was reduced in the cooler to a suitable foaming temperature. The foamable gel was conveyed through the die into a region of reduced pressure to form the foam.

The polystyrene resin was of 200,000 weight average molecular weight according to size exclusion chromatography. Additives included talc, calcium stearate (CaSt), magnesium oxide (MgO), linear low density polyethylene (LLDPE), and high density polyethylene (HDPE). Talc was employed as a nucleating agent, CaSt as an acid scavenger, MgO as an extrusion aid, and LLDPE to enhance open-cell content in the resulting foam. Not all additives were used in every example.

Blowing agent content varied, and was selected from chlorodifluoromethane (HCFC-22), 1-chloro,-1,1-difluoroethane (HCFC-142b), ethyl chloride (EtCl), and carbon dioxide ($CO_2$).

Open cell content was determined according to ASTM D2856-87. Cell size was determined according to ASTM D3576-77. Density was determined according to ASTM D-1622-88. Heat distortion temperature was determined per ASTM D-2126-87 by measuring dimensional change after exposing foam for one hour, two hours, or three days at different temperatures using ≦2.0% in any direction, or ≦5.0% in total volume as a criteria.

It was found that: as foaming temperature was increased, open-cell content increased; as cell size decreased, open-cell content increased; as die pressure drop increased, the open-cell content increased; and as open-cell content increased, the heat distortion temperature increased.

TABLE 1

| | Blowing Agent Composition | | | | | | | | | Heat Distortion |
|---|---|---|---|---|---|---|---|---|---|---|
| Run Number | HCFC-142b (pph) | EtCl (pph) | $CO_2$ (pph) | Talc (pph) | Die ΔP psi (kPa) | Density pcf (kg/m³) | Cell size (mm) | Open Cell Content (percent) | Foaming Temp. (°C.) | Temp. °F. (°C.) |
| 1* | 7.5 | 2.0 | 1.36 | 0.5 | 1100(7579) | 1.89(30.2) | 0.14 | 1.2 | 135 | 200.5(93.6) |
| 2* | 7.5 | 2.0 | 1.36 | 0.5 | 950(6550) | 1.68(26.9) | 0.22 | 3.6 | 140 | 203.0(95) |
| 3 | 7.5 | 2.0 | 1.36 | 0.5 | 820(5650) | 1.67(26.7) | 0.14 | 16.0 | 145 | 211.0(99.4) |
| 4 | 7.5 | 2.0 | 1.36 | 0.5 | 1260(8681) | 1.79(28.6) | 0.15 | 43.8 | 145 | 218.0(103.3) |
| 5 | 1.0 | — | 3.3 | 0.0 | 2600(17914) | 2.42(38.7) | 0.20 | 52.1 | 145 | 223.0(106.1) |
| 6 | 1.0 | — | 3.3 | 0.0 | 2670(18396) | 2.37(37.9) | 0.25 | 63.9 | 150 | 222.5(105.8) |
| 7 | 7.5 | 2.0 | 1.36 | 0.5 | 1080(7441) | 1.91(30.6) | 0.20 | 82.6 | 155 | 219.5(104.2) |
| 8 | 7.5 | 2.0 | 1.36 | 0.5 | 900(6200) | 1.60(25.6) | 0.15 | 85.2 | 150 | 221.0(105) |
| 9 | 7.5 | 2.0 | 1.36 | 0.5 | 1050(7235) | 1.66(26.6) | 0.13 | 92.5 | 154 | 219.5(104.2) |
| 10 | 7.5 | 2.0 | 1.36 | 0.5 | 1070(7372) | 1.75(28) | 0.13 | 92.8 | 149 | 219.5(104.2) |
| 11 | 2.5 | 0.5 | 4.3 | 0.0 | 1210(8337) | 2.26(36.2) | 0.11 | 92.8 | 150 | 219.5(104.2) |

*Not an example of the present invention

TABLE 2

| | Blowing Agent Composition (pph) | | | | | BA Loading | Foaming Temp. | | Die ΔP | | Additives (pph) | | | | | | Cell Size | Density | | Open Cell Content | Heat Distortion Temp. | |
|---|---|---|---|---|---|---|---|---|---|---|---|---|---|---|---|---|---|---|---|---|---|---|
| Run Number | HCFC-142b | EtCl | CO₂ | HCFC-22 | Steam | (gram-moles/100 lbs) | °C. | (°F.) | psi | (kPa) | Talc | MgO | CaSt | Blue | LLDPE | HDPE | (mm) | pcf | (kg/m³) | (percent) | °F. | (°C.) |
| 12* | 10.0 | | 1.75 | | | 0.138 | 138 | (280) | 920 | (6340) | 0.5 | 0.5 | 0.2 | — | | | 0.11 | 2.05 | (32.8) | 5.6 | 195 | (90.5) |
| 13 | 10.0 | | 1.75 | | | 0.138 | 144 | (291) | 920 | (6340) | 0.5 | 0.5 | 0.2 | — | | | 0.11 | 1.79 | (28.6) | 68.0 | — | |
| 14 | 8.25 | | 2.5 | | | 0.139 | 142 | (287) | 970 | (6680) | 0.5 | 0.5 | 0.2 | — | | | 0.17 | — | | 46.0 | 210 | (98.8) |
| 15* | 8.25 | | 1.0 | | | 0.105 | 137 | (278) | 896 | (6170) | 4.0 | — | 0.25 | 0.5 | | | 0.08 | 2.65 | (42.4) | 21.0 | — | |
| 16 | 8.25 | | 1.0 | | | 0.105 | 140 | (284) | 840 | (5790) | 4.0 | — | 0.25 | 0.5 | | | 0.10 | 2.57 | (41.1) | 58.3 | 213 | (101) |
| 17 | 4.8 | | 2.5 | | | 0.105 | 137 | (278) | 980 | (6750) | 4.0 | — | 0.25 | 0.5 | | | 0.09 | 2.61 | (41.8) | 55.7 | 213 | (101) |
| 18 | 8.25 | | 1.0 | | | 0.105 | 137 | (278) | 880 | (6060) | 7.0 | — | 0.25 | 0.5 | | | 0.07 | 2.68 | (42.9) | 40.1 | — | |
| 19 | 10.0 | — | 1.75 | | | 0.138 | 135 | (275) | 930 | (6410) | 0.5 | 0.5 | 0.2 | | 10.0 | | 0.20 | 1.90 | (30.4) | 35.2 | — | |
| 20 | 10.0 | — | 1.75 | | | 0.138 | 138 | (280) | 950 | (6550) | 0.5 | 0.5 | 0.2 | | 10.0 | | 0.22 | 1.77 | (28.3) | 58.0 | — | |
| 21 | 6.1 | 2.5 | 2.5 | | | 0.157 | 135 | (275) | 960 | (6610) | 0.5 | 0.5 | 0.2 | | 10.0 | | 0.20 | 1.81 | (28.9) | 38.2 | — | |
| 22 | 6.1 | 2.5 | 1.6 | | | 0.136 | 135 | (275) | 880 | (6060) | 0.5 | 0.5 | 0.2 | | 15.0 | | 0.3 | 1.93 | (30.8) | 54.7 | 210 | (98.8) |
| 23* | 6.1 | 2.5 | 1.6 | | | 0.136 | 132 | (269) | 965 | (6670) | 0.5 | 0.5 | 0.2 | | 15.0 | | 0.28 | 2.04 | (32.6) | 23.7 | — | |
| 24* | | | 1.0 | 8.0 | | 0.116 | 138 | (280) | 1036 | (7138) | 0.5 | 0.1 | 0.15 | — | | | 0.2 | 2.18 | (34.9) | 5.4 | 195 | (90.5) |
| 25 | | | 1.0 | 8.0 | | 0.116 | 142 | (287) | 922 | (6350) | 0.5 | 0.1 | 0.15 | — | | | 0.14 | 2.11 | (35.8) | 44.1 | — | |
| 26* | | | 1.0 | 8.0 | | 0.116 | 137 | (278) | 929 | (6400) | 2.0 | — | 0.25 | 0.5 | | | 0.1 | 2.4 | (38.4) | 17.0 | — | |
| 27 | | | 1.0 | 8.0 | | 0.116 | 140 | (284) | 846 | (5830) | 2.0 | — | 0.25 | 0.5 | | | 0.09 | 2.27 | (36.3) | 46.7 | 213 | (101) |
| 28 | | | 1.0 | 8.0 | | 0.116 | 138 | (280) | 936 | (6450) | 0.5 | 0.1 | 0.15 | — | | 10.0 | 0.3 | 2.47 | (39.5) | 76.0 | — | |
| 29* | | | 1.0 | 8.0 | | 0.116 | 132 | (269) | 880 | (6060) | 0.5 | 0.1 | 0.15 | — | | 10.0 | 0.38 | 2.27 | (36.3) | 9.3 | — | |
| 30 | | | 1.0 | 8.0 | | 0.116 | 135 | (275) | 870 | (6000) | 0.5 | 0.1 | 0.15 | — | | 10.0 | 0.41 | 2.24 | (35.8) | 48.3 | 210 | (98.8) |
| 31 | | | | 9.0 | — | 0.105 | 137 | (278) | 925 | (6370) | 2.0 | — | 0.25 | 0.5 | | | 0.05 | 2.68 | (42.9) | 54.1 | 210 | (98.8) |
| 32 | | | | 9.0 | — | 0.105 | 140 | (284) | 837 | (5770) | 2.0 | — | 0.25 | 0.5 | | | 0.07 | 2.59 | (41.4) | 61.6 | — | |
| 33 | | | | 9.0 | — | 0.105 | 137 | (278) | 910 | (6270) | 2.0 | — | 0.25 | 0.5 | | | 0.09 | 2.33 | (37.3) | 63.0 | 210 | (98.8) |

TABLE 2-continued

| Run Number | Blowing Agent Composition (pph) | | | | BA Loading (gram-moles/100 lbs) | Foaming Temp. °C. (°F.) | Die ΔP psi (kPa) | Additives (pph) | | | | | | Cell Size (mm) | Density pcf (kg/m³) | Open Cell Content (percent) | Heat Distortion Temp. °F. (°C.) |
|---|---|---|---|---|---|---|---|---|---|---|---|---|---|---|---|---|---|
| | HCFC-142b | EtCl | CO₂ | HCFC-22 | Steam | | | | Talc | MgO | CaSt | Blue | LLDPE | HDPE | | | | |
| 34 | | | | 9.0 | yes | 0.105 | 137 (278) | 925 (6370) | 2.0 | — | 0.25 | 0.5 | | | 0.07 | 2.69 (43.0) | 40.5 | — |
| 35 | | | | 8.0 | — | 0.093 | 138 (280) | 937 (6460) | 7.0 | 0.1 | 0.05 | — | | | 0.06 | 2.88 (46.1) | 40.0 | — |
| 36 | | | | 8.0 | — | 0.093 | 140 (284) | 855 (5890) | 7.0 | 0.1 | 0.05 | — | | | 0.06 | 3.09 (49.4) | 65.0 | — |

*Not an example of the present invention

While embodiments of the foam and the process of the present invention have been shown with regard to specific details, it will be appreciated that depending upon the manufacturing process and the manufacturer's desires, the present invention may be modified by various changes while still being fairly within the scope of the novel teachings and principles herein set forth.

We claim:

1. A process for making an extruded, open-cell alkenyl aromatic polymer foam, the foam having a minor dimension in cross-section of greater than 0.25 inch, the foam having 30 percent or more open cell content comprising:
   a) heating an alkenyl aromatic polymer material comprising greater than 90 percent polystyrene;
   b) incorporating into the melt polymer material an amount of a nucleating agent;
   c) incorporating into the melt polymer material at an elevated pressure a blowing agent to form a foamable gel;
   d) cooling the foamable gel to a lower temperature; and
   e) extruding the foamable gel through a die into a region of reduced pressure to form the foam; the process being characterized in that the nucleating agent is incorporated in an amount sufficient to result in a foam having 30 percent or more open cell content, the foamable gel being cooled to a foaming temperature of from 118° C. to 145° C. wherein the foaming temperature is from 3° C. to 15° C. higher than the highest foaming temperature for a corresponding closed-cell foam.

2. The process of claim 1, wherein the open cell content is from 40 to 60 percent.

3. The process of claim 1, wherein the foaming temperature is from 10° C. to 15° C. higher than the highest foaming temperature for the corresponding closed-cell foam.

4. The process of claim 1, wherein the foamable gel is cooled to a foaming temperature of 135° C. to 140° C.

5. The process of claim 1, wherein the blowing agent comprises carbon dioxide.

6. The process of claim 5, wherein the blowing agent further comprises ethyl chloride.

7. The process of claim 1, wherein the foamable gel is extruded through a die into a region of atmospheric pressure.

8. The process of claim 1, wherein the foamable gel is extruded through a die into a region of subatmospheric pressure.

9. The process of claim 1, wherein the foam is made substantially free of rubbery polymer content and thermoset polymer content.

10. The process of claim 1, wherein the foam is extruded in a minor dimension in cross-section of 0.375 inches or more.

11. The process of claim 1, wherein the alkenyl aromatic polymer material consists essentially of polystyrene.

12. The process of claim 1, wherein the alkenyl aromatic polymer material comprises 95 percent or more polystyrene.

* * * * *

UNITED STATES PATENT AND TRADEMARK OFFICE
CERTIFICATE OF CORRECTION

Page 1 of 2

PATENT NO. : 5,824,710
DATED : October 20, 1998
INVENTOR(S) : Daniel D. Imeokparia, et al.

It is certified that error appears in the above-identified patent and that said Letters Patent is hereby corrected as shown below:

On the title page, insert item[56]:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 4 | 1 | 1 | 0 | 8 | 7 | 5/2/95 | Imeokparia, et al | | | |
| | | 3 | 3 | 6 | 7 | 8 | 9 | 1 | 2/6/68 | Ingram | | | |
| | | 4 | 0 | 2 | 0 | 0 | 2 | 5 | 4/26/77 | Zelitler, et al | | | |
| | | 4 | 0 | 4 | 1 | 1 | 1 | 5 | 8/9/97 | Jenkins, et al | | | |
| | | 3 | 8 | 2 | 2 | 3 | 3 | 1 | 7/2/74 | Cogliano | | | |
| | | 4 | 5 | 3 | 2 | 2 | 6 | 5 | 7/30/85 | Park, et al | | | |
| | | 4 | 0 | 7 | 9 | 1 | 7 | 0 | 3/14/78 | Cluff | | | |
| | | 3 | 4 | 8 | 6 | 9 | 4 | 6 | 12/30/69 | Duddy | | | |
| | | 5 | 0 | 3 | 7 | 8 | 5 | 9 | 8/6/91 | Williams, Jr. et al | | | |
| | | 4 | 9 | 6 | 6 | 9 | 1 | 9 | 10/30/90 | Williams, Jr. et al | | | |
| | | 3 | 7 | 5 | 3 | 9 | 3 | 2 | 8/21/73 | Jenkins | | | |

UNITED STATES PATENT AND TRADEMARK OFFICE
CERTIFICATE OF CORRECTION

Page 2 of 2

PATENT NO. : 5,824,710
DATED : October 20, 1998
INVENTOR(S) : Daniel D. Imeokparia, et al.

It is certified that error appears in the above-identified patent and that said Letters Patent is hereby corrected as shown below:

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION | |
|---|---|---|---|---|---|---|---|---|---|---|---|---|---|
| | | | | | | | | | | | | YES | NO |
| | | 0 | 0 | 8 | 4 | 2 | 2 | 6 | 7/27/83 | EPO | | | |
| | | 1 | 1 | 0 | 0 | 7 | 2 | 7 | 1/24/68 | Great Britain | | | |
| | | 8 | 6 | 0 | 6 | 0 | 8 | 4 | 10/23/86 | PCT | | | |
| | | 0 | 3 | 9 | 7 | 4 | 6 | | 4/7/77 | Japan | | | |
| | | 1 | 5 | 5 | 7 | 2 | 4 | | 6/20/89 | Japan | | | |
| | | 0 | 4 | 4 | 2 | 1 | 0 | 2 | 8/21/91 | EPO | | | |
| | | | | | | | | | | | | | |
| | | | | | | | | | | | | | |

Signed and Sealed this

Eleventh Day of July, 2000

Attest:

Q. TODD DICKINSON

Attesting Officer

Director of Patents and Trademarks